United States Patent [19]

Yin et al.

[11] 4,208,740
[45] Jun. 17, 1980

[54] ADAPTIVE DELTA MODULATION SYSTEM

[75] Inventors: Huo-Bing Yin, Potomac; Robert J. Hallett, Adelphi, both of Md.

[73] Assignee: International Business Machines Corporation, Armonk, N.Y.

[21] Appl. No.: 971,587

[22] Filed: Dec. 20, 1978

[51] Int. Cl.$^2$ ........................................... H03K 13/22
[52] U.S. Cl. .................................. 375/30; 332/11 D; 370/7
[58] Field of Search ................... 325/38 B; 332/11 D; 179/15 AP, 15 AV

[56] References Cited

U.S. PATENT DOCUMENTS

| | | | |
|---|---|---|---|
| 3,899,754 | 8/1975 | Brolin | 332/11 D |
| 3,971,987 | 7/1976 | Carrubba et al. | 325/38 B |
| 4,059,800 | 11/1977 | Jones, Jr. | 325/38 B |

OTHER PUBLICATIONS

"Adaptive Delta Modulation with One Bit Memory" Jayant, Bell Sys. T. J. vol. 49, No. 3, pp. 321-342, (Mar. 1970).
"Overshoot Suppression in ADM Modulator Links for Video Transmission" Weiss et al., 1973 Conference, National Telecommunications Conference vol. I, Atlanta, Ga., (26-28, Nov. 1973).

*Primary Examiner*—Robert L. Griffin
*Assistant Examiner*—Peter Durigon
*Attorney, Agent, or Firm*—John E. Hoel

[57] ABSTRACT

An adaptive delta modulation system is disclosed which features an improved digital compandor which may be used with a digital integrating network. The compandor executes a companding algorithm having a nonlinear characteristic to provide a rapid increase in step size to follow the fast rising start or fast decaying end of talkspurts in input signals so as to minimize any slope overload distortions and to provide a small increase or decrease in step size during the smooth portion of the talkspurts in input signals to reduce any granular noise effect. The step size generated by the compandor is directly related to the input signal level, providing a maximum companding range in which good signal-to-noise characteristics are preserved for the soft or low voiced speaker as well as for the loud voiced speaker and providing a fast transient response most suitable for telephone applications. The step size logic of the compandor has a built-in minimum step size circuit which insures that a well behaved idle pattern of alternating ones and zeros will appear at the digital output when the input signal is zero, and which provides a mechanism to rapidly build up the step size when an input signal appears. The step sizes can be integrated with an integrating network to reconstruct the input signal. The compandor may be used in conjunction with a digital integrating network which exhibits, for example, a system function, having either a single pole or a zero and a pair of poles which may be real or complex. The filter constants can be chosen to match any input spectrum to obtain optimum performance. A significantly high signal-to-noise ratio and a wide companding range have been obtained with the disclosed compandor. By providing storage elements in the compandor and in a digital integrating network and storing the calculated intermediate values, a plurality of input for output analog signals can be time division multiplexed and delta modulated with a single delta modulation system.

6 Claims, 6 Drawing Figures

TIME DIVISION MULTIPLEXED ADAPTIVE DELTA MODULATION SYSTEM

ADAPTIVE DELTA MODULATION SYSTEM

FIELD OF THE INVENTION

The invention disclosed broadly relates to voice signal digitizing circuits and more particularly relates to an adaptive delta modulation system.

BACKGROUND OF THE INVENTION

In a delta modulated communication system, the analog signal to be transmitted is digitized into a stream of bits which subsequently may be reconstructed into a waveform approximating that of the original analog signal. In this wave reconstruction process, binary one bits cause the wave amplitude to increment in a positive sense while binary zero bits cause the wave amplitude to increment in a negative sense. The resulting stepped wave envelope follows the original wave envelope in a reasonably accurate manner. In a feedback loop at the transmitting end of the delta modulation system, the stepped wave envelope is constructed from the bits which are to be transmitted and this envelope is continuously compared with the original analog wave envelope to control the generation of the binary one or binary zero bits as may be required to construct the desired signal waveform at the system's receiver.

Since speech exhibits a wide range of signal levels and consists of talkspurts, a compandor circuit is required to preserve signal-to-noise ratio for all levels of signals and the fidelity of the signal. Delta modulation circuits incorporate various forms of adaptive companding techniques to satisfy voice applications. These adaptive companding techniques provide step size adjustments to the change of the input signal and enhance the dynamic companding range of the coding system. In general, adaptive compandors cause the step size to be reduced when the slope of the input signal is small and increase the step size when the slope is steep so as to provide better tracking over a wide range of input levels. However, prior art adaptive delta modulation systems have been confronted with the problems of quantization noise and slope overload noise. Quantization noise is introduced in the process of sampling the input analog waveform. Delta modulators must generate some quantization noise in order to produce the binary positive and negative voltage levels. In delta modulation, the rate of occurrence of each binary level is proportional to the slope of the analog input signal. When the slope increases or decreases fast enough to prevent the staircase feed back signal from tracking the input analog signal, a stream of binary ones or binary zeros will be output by the decoder. This condition is called "slope overload" which generally causes a much larger noise than does quantization noise, and which substantially reduces waveform fidelity. The slope overload further degrades the transient response.

OBJECTS OF THE INVENTION

It is therefore an object of the invention to provide an improved adaptive delta modulation system.

It is another object of the invention to provide an improved adaptive delta modulation system that has a reduced quantization noise.

It is yet a further object of the invention to provide an improved adaptive delta modulation system which has a reduced slope overload noise characteristic.

It is still a further object of the invention to provide an improved adaptive delta modulation system which has a larger companded range.

It is still a further object of the invention to provide an improved adaptive delta modulation system which can be digitally implemented to enable hardware savings through multiplexing applications.

It is still a further object of the invention to provide an improved adaptive delta modulation system which has an improved dynamic transient response.

It is still a further object of the invention to provide an improved adaptive delta modulation system which has better noise immunity.

SUMMARY OF THE INVENTION

These and other objects, features and advantages of the invention are provided by the adaptive delta modulation system disclosed herein. The system includes an analog input connected to a first input of an analog signal compare means whose output in turn is connected to a periodic sampling means generating a delta modulated signal $d_i$ (a binary bit, either one or zero) at a sampling frequency which is provided to a digital output. The delta modulated signal $d_i$ is also provided to the input of a companding means whose companding signal output $a_i$ is connected through an integrating filter means to a reconstructed analog signal input. The companding means includes a digital switching circuit for calculating three distinctive step sizes depending upon the logic states of $d_i, d_{i-1}, \ldots d_o$, the delta modulated signals (binary bits), at the time $t=i, i-1, \ldots 0$, respectively. For alike bits $\geq 3$, the step size at $t=i$ is $$a_i = [(A + C) a_{i-1}] + A \left( \sum_{n=o}^{n=i-2} a_n \right) \quad (1)$$

Equation (1) is a polynomial of $a$s and is a nonlinear function which yields the step size increment largely enhanced by the summation of the previous values of step sizes. When there are only two alike bits ($d_i = d_{i-1}$), the step size is $$a_i = [(A+C)a_{i-1}] \quad (2)$$

and, thus the increment becomes much smaller. When two dislike bits ($d_i \neq d_{i-1}$) occur, the step size generated by the companding means is $$a_i = [(C-B)a_{i-1}] \quad (3)$$

where A, B, C are constants and are chosen that $(A+C) >$ unity, and $(C-B) <$ unity.

The value $a_o$ at $t=o$ represents the minimum step size generated by the companding means to insure that a well behaved idle pattern $(1, 0, 1, 0, \ldots)$ will appear at the output of the delta modulator when there is no input signal. The frequency of the idle pattern is exactly one-half of the sampling frequency. This yields an extremely low amplitude idling noise from the delta modulator. The minimum step size further provides a means to build up the step size when a signal suddenly appears at the input. The step size shown by Equation (1) increases rapidly when more than three alike bits occur at the beginning of the talkspurt or the fast decay of a signal. Equations (2) and (3) apply when the reconstructed analog waveform closely approximates the input signal.

The step sizes are then integrated by an integrating network to form the reconstructed waveform fed back to the compare means. The integrating network may be a digital implementation and may consist, for example, of either one pole for single integration or two poles which may be either real or complex in the Z-plane, for double integration. The pole locations can be altered by varying the constants to match the spectrum of any type of analog input signal.

In this manner, the adaptive digital companding of the delta modulated signal fed back to the compare means is achieved with a minimum of quantization noise, a minimum of slope overload noise and a maximum companding range. A significantly high signal-to-noise ratio is observed using 1004 Hz tone measurements (North American Standards) at a 32 kilo bit per second sampling rate.

By providing storage elements which store the calculated intermediate values of the digital compandor and digital integrating network, a plurality of input and output analog signals can be time division multiplexed with one delta modulation system to save implementation cost.

DESCRIPTION OF THE FIGURES

These and other objects, features, and advantages of the invention may be more fully understood with reference to the accompanying figures.

DISCUSSION OF THE PREFERRED EMBODIMENT

An adaptive delta modulation system is disclosed which includes an improved digital compandor and a digital integrating network. The compandor generates optimum step sizes to accommodate a wide range of analog signal levels including the fast rise and/or decay of input signals to achieve a minimization of slope overload and granular noise problems and a maximization of companding range. The reconstructed waveform in the time domain is accomplished by integrating these optimum step sizes through a digital integrating network which may be, for example, a single pole or a double pole filter. The filter constants can be selected to approximately match any spectrum of the input signals, for example, speech or low speed analog modem signals, such that the disclosed delta modulation system is insensitive to the noise associated with the transmission medium and such that the performance of the delta modulation system is enhanced by a further reduced quantization noise. By providing storage elements in the digital compandor and the digital integrating network, the delta modulation system can be time multiplexed with a plurality of input and output analog signal lines.

Figure 1:
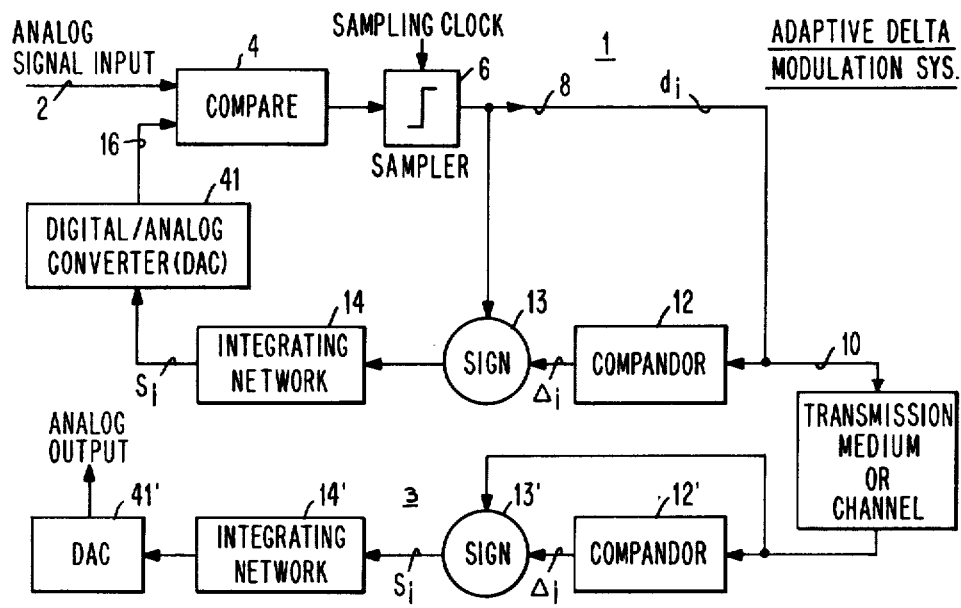
FIG. 1 is an adaptive delta modulation system.

FIG. 1 illustrates a schematic description of the adaptive delta modulation system. The analog input 2 is connected to one of the inputs of the analog signal compare means 4 whose output, in turn, is connected to a periodic sampling means 6 which generates a delta modulated signal $d_i$ at the output 8 which is provided to the system output 10, where the sampling frequency of 6 is provided by a clock. The delta modulated signal $d_i$ is also provided to the input of the companding means 12, whose companded signal output $\Delta_i$, modified by the sign means 13, is connected through an integrating network means 14. The reconstructed analog signal output 16 from the digital-analog converter means 41 is fed to the analog signal compare means 4. Comparator 4 compares the analog input at 2 to the reconstructed signal at 16 from the Digital to Analog Converter (DAC) 41. If the analog input at 2 is greater than or equal to the output of the DAC at 16, the binary value of one, which denotes a positive sign, is output by the sampler 6. If the analog input is less than the output of the DAC 41, the binary value of zero which represents a negative signal is output from the sampler 6. Sequential bits are generated by the sampler 6 to periodically sample the comparator 4 output. The resulting delta modulated bit stream is output at 10 over the communication channel to the delta modulation system signal receiver 3. The delta modulated signal is demodulated at the receiver 3, which contains the same circuitry as the modulator 1, except for the voltage comparator 4. The demodulator 3 receives the delta modulated bits and, based on information contained within this bit stream, reconstruct the analog signal, as explained herein.

The primary control unit of this system is the adaptive compandor unit 12. In order to minimize the quantization noise or maximize the signal-to-noise ratio, and minimize the slope overload distortion, the adaptive compandor exhibits the following properties;

(a) Step size is increased or decreased rapidly to follow the beginning or decaying of the talkspurt (or fast rise or fall of any analog signal) to minimize slope overload problems.

(b) Step size is increased smoothly during the smooth sections of the talkspurt to reduce the granular noise.

(c) Step size is decreased gradually and in small steps for the same reason.

(d) Step size and input level are linearly related to achieve a maximum companding range over which the signal-to-noise ratio is maintained for the soft or low voiced speaker as well as for the loud voiced speaker.

Figure 2:
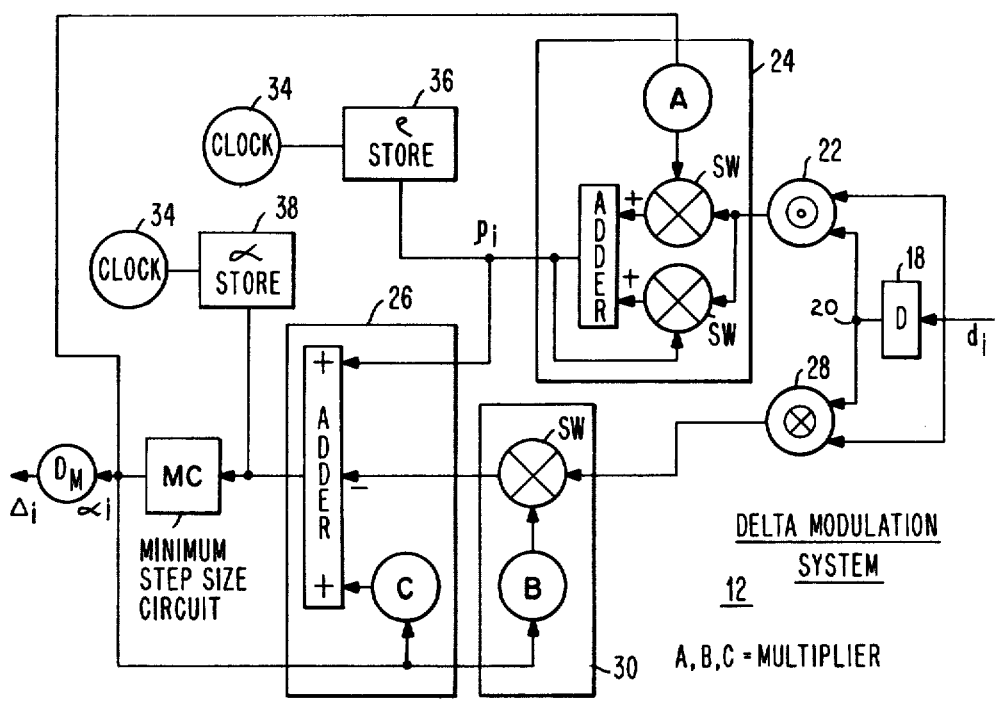
FIG. 2 is a logic diagram of the compandor.

FIG. 2 shows the logic diagram of the delta modulation system compandor 12 for generating the optimum step sizes according to the above criteria. Symbols used in the diagram are described as follows:

A, B, and C are constants to change the step sizes according to the bit sequence, and are less than unity. However $(A+C) > 1$ and $(C-B) < 1$.

$d_i$ and $d_{i-1}$ are binary digits generated at $t=i$ and $t=i-1$.

D represents a unit time delay stage 18.

MC denotes a minimum step size which is used to insure (1) that the step size can be built-up when an analog signal is present, and (2) that a well behaved idle pattern of (1,0,1,0,1,0, . . . ) appears at the digital output when the input signal is zero. MC has a value corresponding to the least significant bit of the DAC.

DM indicates a gain factor and is a constant to ease the amplitude matching between the compandor and the integrating network 14.

The generation of step sizes depends upon the logic states of the bit sequence. There are three distinct step sizes corresponding to the conditions that (a) $d_i = d_{i-1}$, (b) $d_i \neq d_{i-1}$, and (c) $d_i = d_{i-1} = d_{i-2} \ldots d_o$, that is there are $\geq 3$ consecutive alike bits.

The compandor 12 includes the delay circuit 18 which is connected between the input of the compandor 12 and the delay node 20. An inverted exclusive OR gate 22 has first and second inputs connected to the input of the companding means 12 and the delay node 20, respectively, for generating an output signal when $d_i$ equals $d_{i-1}$. A first arithmetic means 24 has a control input connected to the output of the inverted exclusive OR gate 22 and a feedback input connected to the companded signal output, for calculating $\rho_i = A\alpha_{i-1} + \rho_{i-1}$. A second arithmetic means 26 has a first input connected to the output of the first arithmetic means 24, and a feedback input connected to the companded signal output and an output connected to the compander output, for calculating the product $C\alpha_{i-1}$, adding it to the calculated value of $\rho_i$ and outputting the sum as $\alpha_i$ when $d_i$ is equal to $d_{i-1}$.

The compandor 12 further includes an exclusive OR gate 28, having a first and second input connected to the input of the companding means 12 and the delay node 20, respectively, for generating an output signal when $d_i$ is not equal to $d_{i-1}$. A third arithmetic means 30 has a control input connected to the output of the exclusive OR gate 28, a feedback input connected to the companded signal output and an output connected to a third input of the second arithmetic means 26, for calculating the value of $B\alpha_{i-1}$. The second arithmetic means 26 calculates the value $(C-B)\alpha_{i-1}$ and outputs that value as $\alpha_i$ when $d_i$ is not equal to $d_{i-1}$.

With this logic implementation, as shown in FIG. 2, the three step sizes thus generated by the compander 12 are as follows.

(a) When there are $\geq 3$ consecutive alike bits the $\Delta_i$ is $$\Delta_i = DM \{(A + C) \alpha_{i-1} + \rho_{i-1}\} \text{ or} \quad (4)$$

$$\Delta_i = DM \{(A + C) \alpha_{i-1} + A ( \sum_{n=i-2}^{o} \alpha_n)\}$$

The step size changes rapidly as demonstrated by the following example. If there are seven consecutive alike bits the $\Delta_6$ (t=6) can be deduced from Equation (1) as $$\Delta_6 = DM \cdot \{(A+C)^6 + A[5(A+C)^4 + 4(A+C)^3 + 3(-2A+1)(A+C)^2 + (6A+2)(A+C) + A^2 + 3A + 1-]\} \cdot \alpha_o \quad (5)$$

where $\alpha_o = MC$ (initial minimum step size embeded in the minimum step circuits). It is a polynomial of $(A+C)$ and is a nonlinear function which yields the step size increment greatly enhanced by the summation of the previous values of $\alpha$s. Since every term in the polynomial is greater than unity, the step size increases rapidly when more than three alike bits occur, to minimize the slope overloading phenomenon at the beginning of a talkspurt or at the rapid fall of a signal.

(b) When there are only two consecutive alike bits, the logic sets $\rho_{i-1}$ to zero and the Equation (4) becomes $$\Delta_i = DM \cdot \{(A+C)\alpha_{i-1}\} \quad (6)$$

and, thus the increment becomes much smaller.

(c) When two consecutive bits are dislike, the step sizes are given by FIG. 2 as $$\Delta_i = DM \cdot \{(C-B)\alpha_{i-1}\} \quad (7)$$

Since the circuit 24 is off and the exclusive OR circuit 28 is on, Equations (6) and (7) are used when the input analog signal is tracking the output of the DAC 41.

Thus, the step size change during the tracking region is small and a minimization of granular noise is achieved. Consequently, a maximum signal-to-noise ratio can be obtained. It should be noted that for best results the constants, $(A+C)$, should be slightly greater than unity and $(C-B)$ should be slightly less than unity for optimum performance.

It should be further noted that truncation of the least significant bits is taking place in the digital calculations. The actual step size thus generated by the logic of compandor 12 is, therefore slightly less than the perfect resolution expressed by Equation (4), (6), or (7). The smaller increments or decrements of the step size during a closely tracking region yield less granular noise and consequently a larger signal-to-noise ratio. The compandor is adaptive to the input signal level, i.e. the step size generation is a linear function of the input signal level, and thus the inherent companding range is large.

It should be further noted that if $\alpha_i$ is less than MC, the minimum step size circuit takes over and forces $\alpha_i = MC$. This insures a well behaved idle pattern (1,0,1,0,1,0, ... ) appears at the digital output of the delta modulation system. The pattern 1,0,1,0,1,0, ... represents a square wave of frequency equal to one-half of the sampling frequency. This pattern results a minimum noise at the digital output.

Digital implementation enables time division multiplexing of several input lines for saving hardware cost, and storage elements are provided for this purpose. A first storage means 36, as shown in FIG. 2, is connected to the output of the first arithmetic means 24, and has a control input connected to the scan clock 34. The first storage means 36 cyclically stores and accesses stored values of $\rho_i$ for each of the corresponding multiple input signal lines, under control of the scan clock 34. A second storage means 38 is connected to the output of the second arithmetic means 26 and cyclically stores and accesses stored values of $\alpha_i$ for each of the corresponding multiple input signal lines, under control of the scan clock 34.

In summary, the compandor shown in FIG. 2 is based upon the logic states of adjacent bits and is a combination of a 2-bit ($d_i = d_{i-1}$ or $d_i \neq d_{i-1}$, and a multi bit ($d_i = d_{i-1} = d_{i-2} = d_{i-3}$. . . ) operation. Equation (4) applies when three or more sensecutive alike bits occur and essentially is a 3-bit operation.

Figure 3:
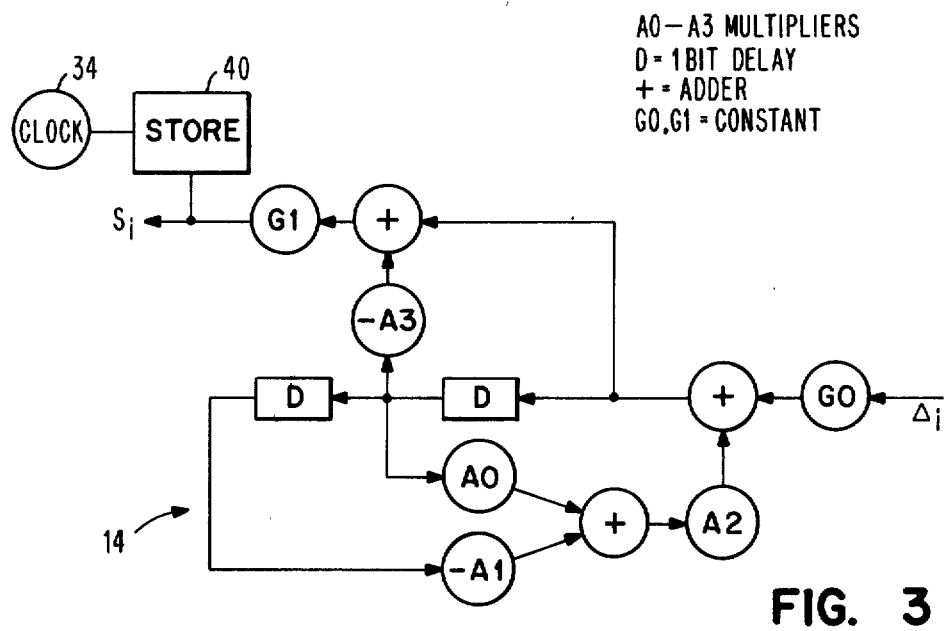
FIG. 3 is a double integrating network filter.

The step sizes generated at various sampling times by compandor 12 have to be integrated by the integrating network means 14 to form a reconstructed wave. The sign bit from circuit 13 is the digital output and controls the direction of the ramp in the integrating network 14. The integrating network 14 can be one of three forms, a perfect integrator, a single integrator (one-pole, low-pass filter), or a double integrator (single-zero, two-pole, low-pass filter). It has been pointed out in the prior art that a two-pole, low-pass filter (1) offers superior performance in reducing the output noise, (2) has a single zero and two poles located on the real axis of the left side of the S-plane, and (3) is implemented in either a digital form or an analog form using R-C networks as disclosed, for example, by J. A. Greefkes, et al., "Code Modulation with Digitally Controlled Companding for Speech Transmission", *Phillips Technical Review*, Vol. 31, 1970, pp. 335–353. It is well-known in the art how to transform an analog filter of this type into digital form using standard transformation techniques. The conversion of any analog filter into an equivalent digital filter is well-known, as is described by C. M. Rader, et al., "Digital Filter Design Techniques in the Frequency Domain", *Proceedings of the IEEE*, Vol. 55, No. 2, February 1967, pp. 149–171. A typical digital filter of second order is shown in FIG. 3. It is of recursive type in canonic form.

The design insures the operating stability of the feedback loop and matches the spectrum of the input signal. It should be pointed out that the decoder is an open loop system, the zero is not required and can be omitted.

Table I lists the values of all constants used for the compandor of FIG. 2 and integrator of FIG. 3 for speech signals. The filter constants, $A_0$, $A_1$, $A_2$, and $G_1$ can be optimized for different applications by matching the filter characteristics to the spectrum of input signals.

TABLE I

| CONSTANT | VALUE FOR SPEECH |
|---|---|
| A | 1/32 |
| B | 1/64 |
| C | 63/64 |
| MC | 1/512 |
| DM | ½ |
| $A_0$ | $(1 + ½ + ¼ + ⅛)$ |
| $A_1$ | $(½ + ¼ + ⅛)$ |
| $A_2$ | 31/32 |
| $A_3$ | $(¼ + ⅛)$ |
| $G_1$ | 2 |
| $G_0$ | ½ |

The time domain waveform is transformed into the reconstructed analog signal by a digital-to-analog converter (DAC) 41 of FIG. 1. The DAC has 11-bits including a sign bit while the register or adder is 14-bits wide. The constant G1 is used for matching amplitude between the input of the DAC and the output of the integrating network.

Figure 4:
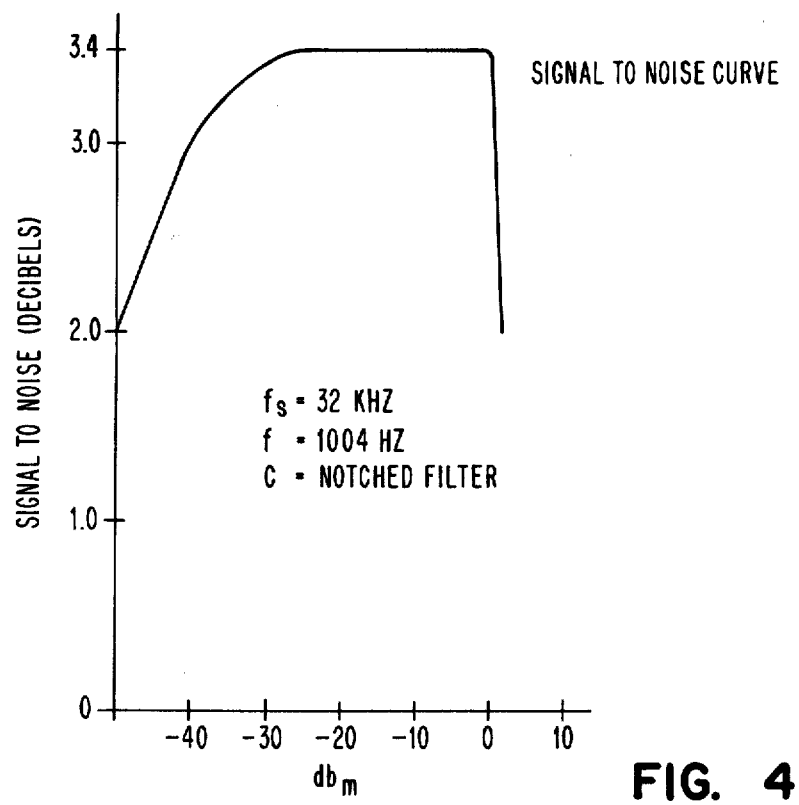
FIG. 4 is a signal-to-noise curve of the adaptive delta modulator system.

The signal-to-noise ratio for a 1004 Hz (North American standard) test tone of the delta modulation system using the disclosed compandor in conjunction with the above example of an integrator is shown in FIG. 4, using a 32 kilo-bit-per-second (Kbps) sampling rate. This represents a considerably higher signal-to-noise ratio than that available in the prior art at this sampling rate. Note also that the companding range is almost the same as that for the Bell System μ-law PCM with μ-255 or the CCITT, 13-segment A-law PCM at 56 kbaud.

For time division multiplexing operations, a storage means 40, as shown in FIG. 3, is connected to the output of the integrating network means 14 and has a control input connected to the scan clock 34, for cyclically storing and accessing stored values of the digitized reconstructed waveform from the integrating network means 14 for the input signal lines, under control of the scan clock 34.

Figure 5:
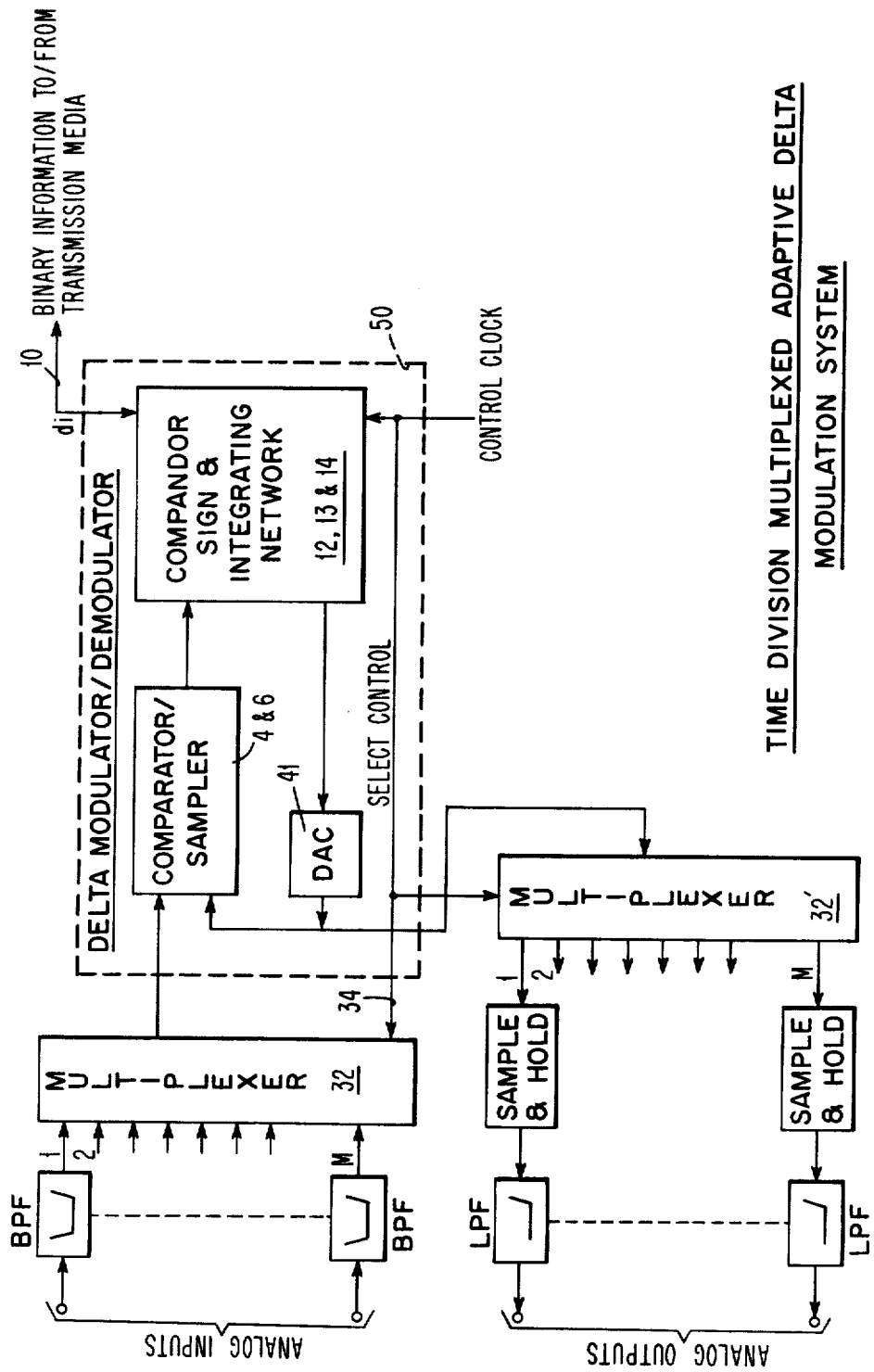
FIG. 5 is a time division multiplexed adaptive delta modulation system.

The digital implementation of the disclosed compandor and example integrating network enable the time division multiplexing of a plurality of M analog input and output signal lines to save hardware and to ease implementation as shown in FIG. 5. The input and output share one delta modulator/demodulator system means 50 which includes only the modulator system means 1 of FIG. 1. The analog components, BPF (bandpass filter), LPF (low pass filter) and sample and hold circuits, are included in the FIG. 5 to show a complete implementation and a practical configuration of analog/digital conversion and digital/analog conversion with a delta modulation system for multiple input and output lines.

Figure 6:
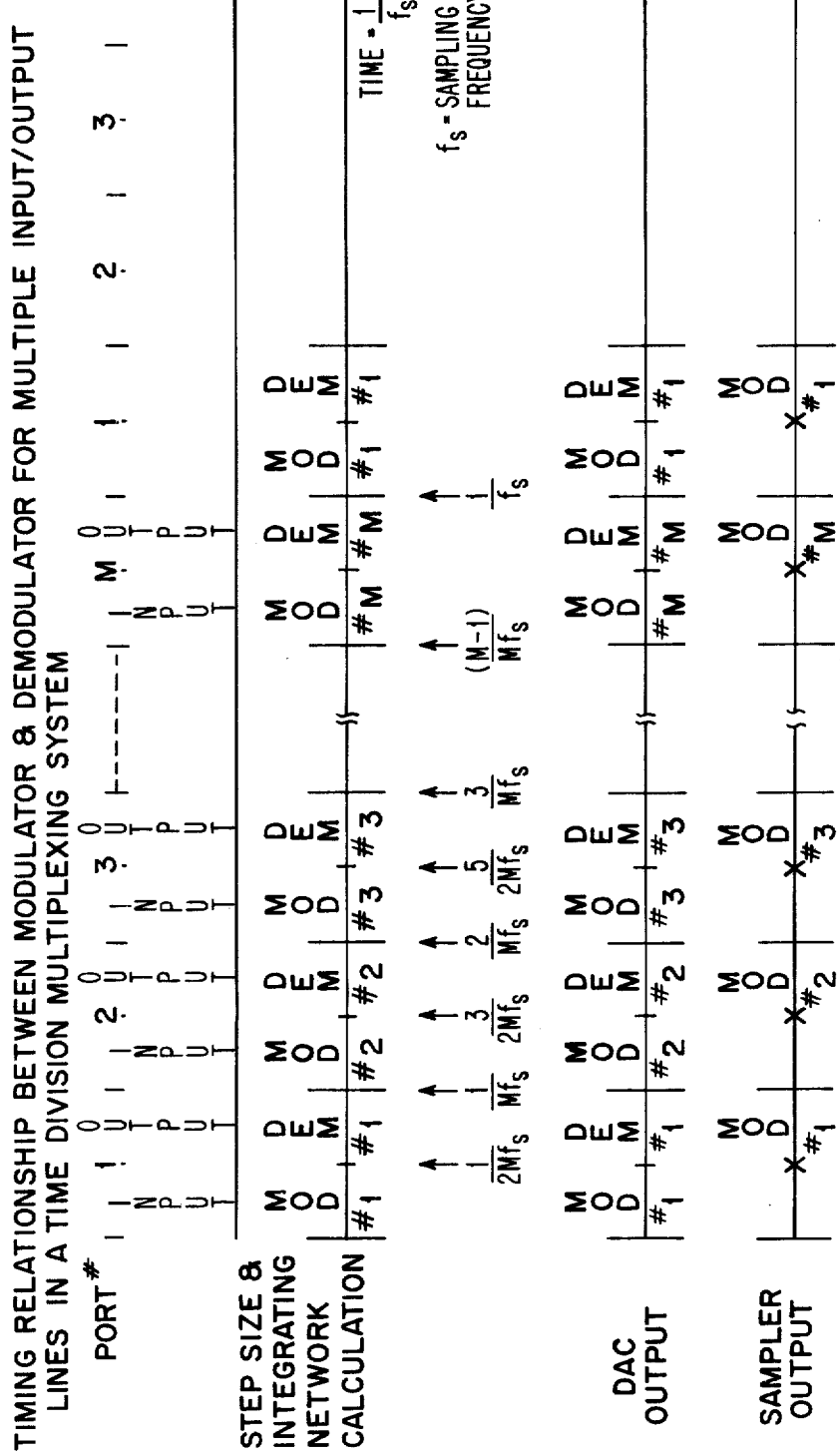
FIG. 6 is a timing relationship between modulator and demodulator for a time division multiplexed adaptive delta modulation system.

The scan clock 34 will control the time available for modulation and demodulation as is shown in FIG. 6. The calculation for modulation and demodulation functions based upon the digital outputs from the sampler and digital inputs from transmission media, respectively, must be accomplished in a time = ½$Mf_s$ for M input and output lines. The reconstructed analog waveform (DAC output) must also be available for the modulator and demodulator within the same time frame. The delta modulation output, from the sampler 6 is available for transmission at a time ½$Mf_s$ later for the corresponding port as indicated in FIG. 6.

The adaptive delta modulation system, shown in FIG. 1 and the adaptive compandor, shown in FIG. 2 provide a large companding range by generating step sizes adaptive to the signal input level and a higher signal-to-noise ratio by reducing the quantization noise and slope overload noise. The signal-to-noise ratio is related to the method for computing the step size in the sampling operation. In the companded delta modulator of FIG. 1, the step size is dynamically changed by monitoring the bit patterns in the delta modulation bit stream. As indicated earlier, it is desirable for the strings of ones or zeroes to cause the step size to increase while alternating one-zero patterns will cause a decrease in the step size.

The resulting adaptive delta modulation system has an improved signal-to-noise ratio with a minimization of quantization noise, a minimization of slope overload distortion, a large companded range, an improved dynamic transient response and a lower susceptibility to channel noise.

While the invention has been particularly shown and described with reference to the preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. In a delta modulation system including an analog input connected to a first input of an analog signal compare means whose output in turn is connected to a periodic sampling means generating a delta modulated signal $d_i$ at a sampling frequency which is provided to a system output and to the input of a companding means whose companded signal output $a_i$ is connected through an integrating network means to a reconstructed analog signal input, wherein said companding means further comprises:

a digital switching circuit for calculating $a_i = \{(C-B)a_{i-1}\}$ when $d_i \neq d_{i-1}$, $a_i = \{(A+C)a_{i-1}\}$ when $d_i = d_{i-1}$, and $$a_i = \{(A + C)a_{i-1}\} + A\left(\sum_{n=0}^{n=i-z} a_n\right)$$

when $d_i = d_{i-1} = \ldots = d_o$ for $i > 2$ where
A, B, C are positive constants less than unity
A+C > unity
C−B < unity, and $\alpha_i$ for $i=0$ is the minimum step size generated by said companding means;

whereby rapid adaptive digital companding of the delta modulation signal fed back via said integrating network to said compare means is achieved.

2. The delta modulation system of claim 1, wherein said companding means further comprises:

a delay means connected between said input of said companding means and a delay node;

an inverted exclusive OR gate having first and second inputs connected to said input of said companding means and said delay node, respectively, for generating an output signal when $d_i = d_{i-1}$;

a first arithmetic means having a control input connected to said output of said inverted exclusive OR gate and a feedback input connected to said companded signal output, for calculating $$\rho_i = A \sum_{n=o}^{n=i-1} \alpha_n;$$

a second arithmetic means having a first input connected to the output of said first arithmetic means, a feedback input connected to said companded signal output and an output connected to said compandor output, for calculating the product $C \alpha_{i-1}$, adding it to said calculated value of $\rho_i$ and outputting the sum as $\alpha_i$ when $d_i = d_{i-1} = d_{i-2} = d_{i-3} \ldots$ (alike bits $> 3$).

3. The delta modulation system of claim 2, wherein said companding means further comprises:

an exclusive OR gate having first and second inputs connected to said input of said companding means and said delay node, for generating an output signal when $d_i \neq d_{i-1}$;

a third arithmetic means having a control input connected to said output of said exclusive OR gate, a feedback input connected to said companded signal output and an output connected to a third input of said second arithmetic means, for calculating the value of the product $B \alpha_{i-1}$;

said second arithmetic means calculating the value $(C-B) \alpha_{i-1}$ and outputting that value as $\alpha_i$ when $d_i \neq d_{i-1}$.

4. The delta modulation system of claim 3, which further comprises a minimum step size circuit having a well behaved idle pattern and a selective build-up in step size.

5. The delta modulation system of claim 3, which further comprises:

a time division analog signal multiplexor connected between a plurality of M analog input signal lines and said first input of said analog signal compare means, having a control input connected to a scan clock, for cyclically connecting each of said M input signal lines to said first input of said compare means under control of said scan clock;

a first storage means connected to said output of said first arithmetic means, having a control input connected to said scan clock, for cyclically storing and accessing stored values of $\rho_i$ for each of said corresponding M input signal lines, under control of said scan clock;

a second storage means connected to said output of said second arithmetic means, having a control input connected to said scan clock, for cyclically storing and accessing stored values of $\alpha_i$ for each of said corresponding M input signal lines, under control of said scan clock;

said integrating network means being a digital filter for converting the companded delta modulated signal output from said companding means, corresponding to each of said M input signal lines;

a digital amplitude storage means connected to an output of said filter means, having a control input connected to said scan clock, for cyclically storing and accessing stored values of said digitized reconstructed analog signal output from said filter means for each of said corresponding M input signal lines, under control of said scan clock;

a digital-to-analog converter connected between said digitized amplitude storage means and said reconstructed analog signal input of said analog signal compare means to enable the comparison by said compare means of the analog signal corresponding to that one of said plurality of multiplexor inputs connected to said first input of said compare means;

whereby a plurality of analog input signals may be delta modulated with a minimum amount of hardware.

6. The delta modulation system of claim 5, wherein time division multiplexing of both M-input and M-output analog signals is achieved.

* * * * *